United States Patent
Ko et al.

(10) Patent No.: US 10,507,822 B2
(45) Date of Patent: Dec. 17, 2019

(54) METHOD OF DECREASING VIBRATION DURING RELEASE OF STOP GEAR OF VEHICLE

(71) Applicant: Hyundai Motor Company, Seoul (KR)

(72) Inventors: Young Kwan Ko, Seoul (KR); Hyung Bin Ihm, Seoul (KR); Tae Young Chung, Gyeonggi-Do (KR)

(73) Assignee: Hyundai Motor Company, Seoul (KR)

(*) Notice: Subject to any disclaimer, the term of this patent is extended or adjusted under 35 U.S.C. 154(b) by 245 days.

(21) Appl. No.: 15/453,031

(22) Filed: Mar. 8, 2017

(65) Prior Publication Data

US 2017/0297560 A1    Oct. 19, 2017

(30) Foreign Application Priority Data

Apr. 14, 2016    (KR) .................. 10-2016-0045300

(51) Int. Cl.
*B60W 20/40*    (2016.01)
*B60L 15/20*    (2006.01)
(Continued)

(52) U.S. Cl.
CPC ......... *B60W 20/40* (2013.01); *B60L 15/2072* (2013.01); *B60L 50/16* (2019.02);
(Continued)

(58) Field of Classification Search
CPC .. B60L 12/14; B60L 11/1851; B60L 15/2072; B60L 2240/30; B60L 2240/423; B60L 2240/54; B60W 10/182; B60W 30/18027; B60W 30/20; B60W 2510/083; B60W 520/04; B60W 2540/12; B60W 2540/16; B60W 2550/142; B60W 2710/083; B60Y 2200/92; B60Y 2300/18025; B60Y 2300/20; Y02T 10/645; Y02T 10/70; Y02T 10/7005;
(Continued)

(56) References Cited

U.S. PATENT DOCUMENTS

| | | | |
|---|---|---|---|
| 6,287,236 B1* | 9/2001 | Ishikawa | B60T 7/12 192/18 A |
| 2008/0035444 A1* | 2/2008 | Schiele | F16H 61/0059 192/219.5 |

(Continued)

FOREIGN PATENT DOCUMENTS

| | | |
|---|---|---|
| JP | 2009-113743 A | 5/2009 |
| JP | 2013-106511 A | 5/2013 |

(Continued)

*Primary Examiner* — Sze-Hon Kong
(74) *Attorney, Agent, or Firm* — Mintz Levin Cohn Ferris Glovsky and Popeo, P.C.; Peter F. Corless (57) ABSTRACT

A method of decreasing vibration during release of a stop gear of a vehicle can be applied to an eco-friendly vehicle for decreasing vibration generated when a driver releases a P step of a gear lever while torsion occurs in a drive shaft of the vehicle. Reaction force torque of a driving motor is controlled so as to output reaction force that has been generated in a parking sprag by a driving motor when torsion occurs in the drive shaft after entrance of the gear lever into the P step, so as to decrease vibration generated because torsion reaction force of the drive shaft vanishes at the same time.

13 Claims, 4 Drawing Sheets

(51) Int. Cl.
   *B60W 10/08*   (2006.01)
   *B60W 10/18*   (2012.01)
   *B60W 30/18*   (2012.01)
   *B60W 30/20*   (2006.01)
   *B60L 50/16*   (2019.01)
   *B60L 58/10*   (2019.01)

(52) U.S. Cl.
   CPC .............. *B60L 58/10* (2019.02); *B60W 10/08* (2013.01); *B60W 10/182* (2013.01); *B60W 30/18027* (2013.01); *B60W 30/20* (2013.01); *B60L 2240/30* (2013.01); *B60L 2240/423* (2013.01); *B60L 2240/54* (2013.01); *B60W 2510/083* (2013.01); *B60W 2520/04* (2013.01); *B60W 2540/12* (2013.01); *B60W 2540/16* (2013.01); *B60W 2550/142* (2013.01); *B60W 2710/083* (2013.01); *B60Y 2200/92* (2013.01); *B60Y 2300/18025* (2013.01); *B60Y 2300/20* (2013.01); *Y02T 10/645* (2013.01); *Y02T 10/70* (2013.01); *Y02T 10/7005* (2013.01); *Y02T 10/705* (2013.01); *Y02T 10/7077* (2013.01); *Y02T 10/7275* (2013.01); *Y10S 903/903* (2013.01)

(58) Field of Classification Search
   CPC .............. Y02T 10/705; Y02T 10/7077; Y02T 10/7275; Y10S 903/903
   See application file for complete search history.

(56) References Cited

U.S. PATENT DOCUMENTS

| | | | |
|---|---|---|---|
| 2009/0043465 A1* | 2/2009 | Tomita | B60K 6/40 701/51 |
| 2012/0032637 A1* | 2/2012 | Kotooka | B60K 6/46 320/109 |
| 2013/0197731 A1* | 8/2013 | Schum | B60L 15/2063 701/22 |
| 2015/0175032 A1* | 6/2015 | Nagamori | B60L 3/0023 701/22 |
| 2015/0246662 A1* | 9/2015 | Masuda | B60T 7/085 701/70 |
| 2015/0303858 A1* | 10/2015 | Katsumata | B60L 15/20 318/139 |
| 2016/0339918 A1* | 11/2016 | Aoyama | B60T 7/122 |
| 2018/0154797 A1* | 6/2018 | Sawada | B60L 15/20 |
| 2018/0290664 A1* | 10/2018 | Suzuki | B60L 15/20 |

FOREIGN PATENT DOCUMENTS

| | | |
|---|---|---|
| JP | 2015-126570 A | 7/2015 |
| KR | 10-2005-0098653 | 12/2005 |
| KR | 10-2012-0137131 | 12/2012 |
| KR | 10-2013-0053036 A | 5/2013 |
| KR | 10-2014-0067395 | 6/2014 |
| KR | 10-2015-0074810 | 7/2015 |
| WO | 2014/103601 A1 | 7/2014 |

* cited by examiner

METHOD OF DECREASING VIBRATION DURING RELEASE OF STOP GEAR OF VEHICLE

CROSS-REFERENCE TO RELATED APPLICATION

This application claims under 35 U.S.C. § 119(a) the benefit of Korean Patent Application No. 10-2016-0045300 filed on Apr. 14, 2016, the entire contents of which are incorporated herein by reference.

BACKGROUND (a) Technical Field

The present disclosure relates to a method of decreasing vibration during release of a stop gear of a vehicle, more particularly, to a method of decreasing vibration during release of the stop gear for decreasing vibration generated when a driver releases a P step of a gear lever while torsion occurs in a drive shaft of the vehicle, which can be an eco-friendly vehicle.

(b) Description of the Related Art

In general, a gear of a vehicle includes a parking apparatus for locking a parking gear fixed to a drive shaft (an output shaft for transferring rotatory power of an engine to a wheel) in a P step (stop gear) to keep the vehicle stopped.

Conventionally, a parking apparatus of a vehicle is configured in such a way that, when a gear lever is moved to a P step (stop gear), a parking rod operatively associated with the gear lever controls a parking sprag to be engaged between teeth of a parking gear so as to lock the parking gear, thereby preventing wheels from rotating.

Accordingly, when the gear lever of the vehicle enters the P step (stop gear), the parking sprag is mechanically connected to the parking gear. In this case, when power such as grade resistance is applied to the vehicle in a longitudinal direction of the vehicle, torsion occurs in the drive shaft as reaction force is generated in the parking sprag, and elastic energy of the drive shaft accumulates due to torsion.

However, when torsion occurs in the drive shaft after the gear lever enters the P step, the reaction force of the parking sprag vanishes when releasing the P step, and in this case, the elastic energy of the drive shaft is emitted at the same time and vehicle vibration is generated.

The above information disclosed in this Background section is only for enhancement of understanding of the background of the disclosure and therefore it may contain information that does not form the prior art that is already known in this country to a person of ordinary skill in the art.

SUMMARY

The present disclosure provides a method of decreasing vibration during release of stop gear of a vehicle (e.g., an eco-friendly vehicle), for controlling reaction force torque of a driving motor so as to output reaction force that has been generated in a parking sprag by a driving motor instead when torsion occurs in the drive shaft connected to a driving wheel of the vehicle after entrance of the gear lever into the P step on a slope to decrease vibration generated because torsion reaction force of the drive shaft vanishes at the same time.

In one aspect, the present disclosure provides a method of reducing vibration during release of a stop gear of a vehicle, the method including determining, by a controller, whether a position of a gear lever of the vehicle is a P step for stop on a slope; determining, by the controller, whether torsion occurs in a drive shaft connected to a driving wheel of the vehicle; and performing, by the controller, control of torque of reaction force of a driving motor so as to generate torque of reaction force by driving the driving motor of the vehicle when it is predicted that the stop of the vehicle is released in a state where torsion occurs in the drive shaft. The method may further include continuously determining whether the control of torque of reaction force of the motor is terminated during the control of torque of reaction force of the motor.

In a preferred embodiment, it is determined that the vehicle stops when the position of the gear lever is a P step for stop, it is determined that torsion occurs in a drive shaft when an absolute value of a difference between drive shaft position information at a time of entrance of the gear lever into the P step and positional information of the drive shaft after entrance into the P step is equal to or greater than a first set value, and it is determined that the control of torque of reaction force of the motor is started when a current position variation value of the drive shaft after entrance into the P step of the gear lever is maintained to be equal to or less than a second set value for a predetermined time.

In a preferred embodiment, the determining of the occurrence of torsion may include determining that torsion occurs in the drive shaft according to a brake release and determining that the control of torque of reaction force of the motor is started when a position value of a brake pedal of the vehicle is equal to or less than a first reference value. Preferably, when the position value of the brake pedal of the vehicle is maintained to be equal to or less than the first reference value for a predetermined time, it is determined that the control of torque of reaction force of the motor is started.

In a preferred embodiment, a reaction force torque in the performing of the control of torque of reaction force of the motor may satisfy $TQ_{ctrl.1}=m_{veh} \cdot g \cdot \sin \theta$, and a reaction force torque that is generated when the stop of the vehicle is released and has corrected errors may satisfy $TQ_{ctrl}=TQ_{ctrl.1}+J \cdot \dot{w}_{mot}$, where $TQ_{ctrl.1}$ is the reaction force torque, $TQ_{ctrl}$ is the corrected reaction torque, J is a rotational inertia of the drive shaft, $w_{mot}$ is a motor velocity, $m_{veh}$ is a vehicle weight, $\theta$ is an inclination angle of a road, and g is acceleration of gravity.

In a preferred embodiment, in order to determine whether the control of torque of reaction force of the motor is terminated, a motor command torque is received and compared with a motor reaction force torque when the position of the gear lever is not the P step for stop, as a comparison result, when a direction of the motor reaction force torque is not a direction of the motor command torque, a motor output torque is maintained to the motor reaction force torque for a predetermined time and then is gradually changed to the motor command torque, and it is determined that the control of torque of reaction force of the motor is terminated when a difference between the motor output torque and the motor command torque is a threshold value or less.

In a preferred embodiment, the method may further include determining that the control of torque of reaction force of the motor is terminated, as the comparison result, when the motor reaction force torque is greater than the motor command torque, if the motor command torque becomes greater than the motor reaction force torque.

In a preferred embodiment, the method may further include maintaining the motor output torque to the motor reaction force torque for the predetermined time and then gradually changing the motor output torque to the motor command torque, as the comparison result, when the motor reaction force torque is greater than the motor command torque, and determining that the control of torque of reaction force of the motor is terminated when a difference between the motor output torque and the motor command torque is equal to or less than a threshold value.

In a preferred embodiment, the method may further include immediately determining that the control of torque of reaction force of the motor is terminated, as the comparison result, when the motor reaction force torque is less than the motor command torque.

In a preferred embodiment, the performing of the control of torque of reaction force of the motor may include determining that the stop of the vehicle is released when a position value of a brake pedal of the vehicle is equal to or more than a second reference value in a state where torsion occurs in the drive shaft.

In another aspect, a non-transitory computer readable medium contains program instructions executed by a processor including: program instructions that determine whether a position of a gear lever of a vehicle is a P step for stop on a slope; program instructions that determine whether torsion occurs in a drive shaft connected to a driving wheel of the vehicle; and program instructions that perform control of torque of reaction force of a driving motor so as to generate torque of reaction force by driving the driving motor of the vehicle when it is predicted that the stop of the vehicle is released in a state where torsion occurs in the drive shaft.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present disclosure, examples of which are illustrated in the accompanying drawings and described below.

Figure 1:
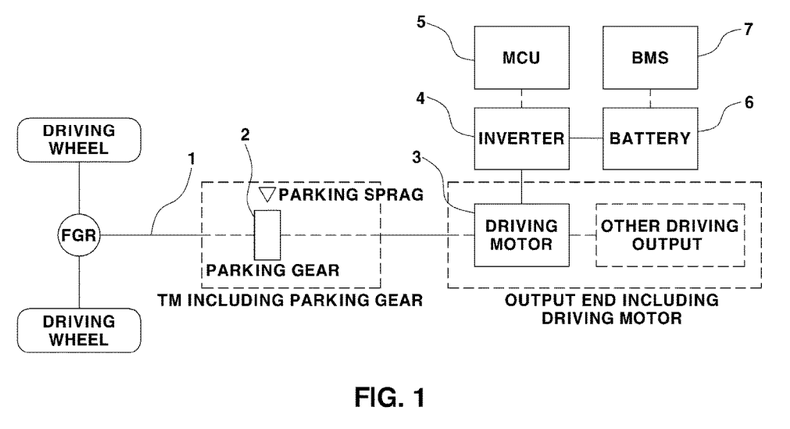
FIG. 1 is a schematic diagram illustrating a parking gear system of a general eco-friendly vehicle.

The present disclosure relates to a method of decreasing vibration generated during driver's P step (stop gear) release when torsion occurs in a drive shaft connected to a driving wheel (an output shaft for transferring rotatory power of an engine to a wheel) in a vehicle, preferably an eco-friendly vehicle such as a hybrid vehicle and an electric vehicle, through control of reaction force of a driving motor. As illustrated in FIG. 1, the present disclosure may be applied to an eco-friendly vehicle including a drive shaft 1 with a parking gear 2 installed therein, a driving motor 3 mechanically connected to the drive shaft 1, a motor control unit (MCU) 5 including an inverter 4 for control of the driving motor 3, a battery 6 for supplying electricity to the driving motor 3, and a battery management system (BMS) 7 for control of the battery 6.

In addition, the present disclosure may also be applied to an eco-friendly vehicle for releasing a P step (stop gear) of a gear lever by a driver so as to release locking of a parking gear installed in a drive shaft via an operation of a wire connected to a gear lever since a parking apparatus (parking gear system) is configured to a shift by-wire type.

With regard to a vehicle that stops on a slope, when a P step (stop gear) is released (e.g., shifting to another gear) after entrance into the P step of a gear lever, a brake is released and then the P step is released.

However, when a driver releases the P step of a gear lever while torsion occurs in a drive shaft, locking of a parking gear is released by a parking sprag, and in this case, elastic energy of the drive shaft due to the torsion is emitted at the same time and vehicle vibration is generated.

Such a phenomenon is an issue that also occurs in a typical internal combustion engine vehicle, and thus vibration may be decreased by structurally enhancing the internal combustion engine vehicle. On the other hand, in the case of an eco-friendly vehicle, although higher vibration is generated due to a simple structure of transmission or absence of an apparatus such as a torque converter compared with the typical internal combustion engine, a driving motor is actively controlled, and thus vibration may be decreased without structural enhancement and impact that a driver experiences may be alleviated compared with the typical internal combustion engine vehicle.

The present disclosure may decrease vibration by generating reaction force by a driving motor instead of a parking sprag at time that a P step is released to prevent drive shaft elastic energy generated due to torsion of the drive shaft from being emitted at the same time and to decrease vibration by considering that reaction force generated in the parking sprag vanishes at the time of release of the P step of a gear lever as power such as grade resistance is applied to the vehicle in a longitudinal direction of the vehicle when the eco-friendly vehicle stops on a slope.

Accordingly, the present disclosure proposes a method of determining torque of reaction force of a driving motor according to a torsion degree of a drive shaft of a vehicle parked on a slope, and a method of determining a control start time of reaction force of a driving motor and determining a control end time of reaction force of the driving motor by determining a driver's intention to release a P step.

Here, whether the vehicle is parked on a slope is determined using information obtained from at least one of an inclination angle sensor and a map (i.e. map information from GPS) mounted in a vehicle, and when the position of the gear lever is a P step, it is determined that the vehicle stops.

In addition, information of a vehicle weight (M) and an inclination angle of a road (θ) where the vehicle is parked are used to calculate force applied toward a driving direction of the vehicle. When the force is equal to or more than a set threshold value, it may be determined that torsion occurs in the drive shaft.

In other words, a value of "a vehicle weight (M)*acceleration of gravity (g)*sin θ" is equal to or more than a set threshold value, it may be determined that torsion occurs in the drive shaft of the vehicle.

The threshold value may be a reference value that determines whether torsion occurs in the drive shaft of the vehicle parked on a slope through a pre-test and evaluation.

Figure 2:
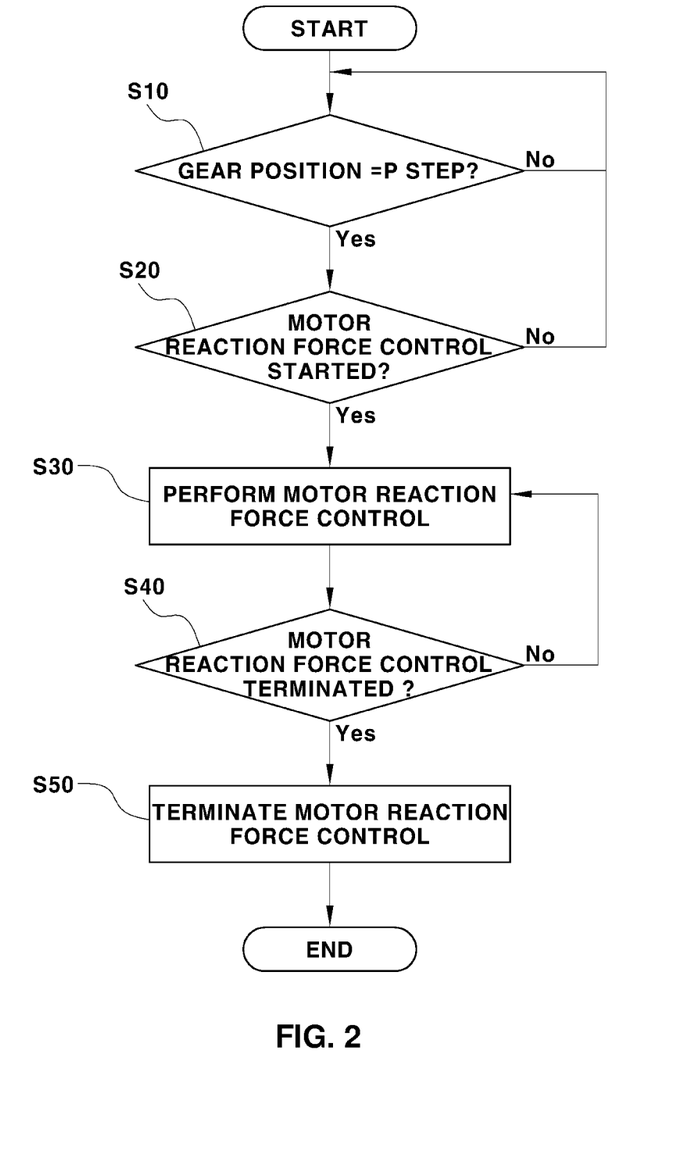
FIG. 2 is a flowchart illustrating a method of decreasing vibration during release of a stop gear of an eco-friendly vehicle according to the present disclosure.

FIG. 2 is a flowchart of a method of decreasing vibration in the case of release of a stop gear of an eco-friendly vehicle according to the present disclosure.

As shown in FIG. 2, whether a driver changes a gear lever of a vehicle parked on a slope (or a gearshift lever) to a P step may be checked (S10), and when the gear lever is changed to the P step, whether control of reaction force of a motor is performed may be determined (S20). When control of reaction force of the motor is determined to be performed, control of reaction force of the motor may be performed (S30) and whether control of reaction force of the motor is terminated may be determined as control of reaction force of the motor is continuously performed (S40). In addition, when termination of the control of reaction force of the motor is determined, the control of reaction force of the motor may be terminated (S50) and a motor command torque determined by a motor controller may be followed.

When the termination of the control of reaction force of the motor is not determined, control of reaction force of the motor may be continuously performed until the termination of the control of reaction force of the motor is determined. As provided herein, the above steps can be performed by the motor controller, including but not limited to the MCU 5 in conjunction with the inverter 4, where the MCU 5 includes a processor for performing instructions to carry out the above-described method steps.

In particular, vehicle vibration generated as elastic energy of a drive shaft is emitted at the time of release of a P step may be decreased using a method including determining whether a position of a gear lever of the vehicle parked on a slope is a stop gear (P step), determining whether control of torque of reaction force of a driving motor for control of a torsion state of the driving motor is started when the position of the gear lever is the stop gear, performing control of torque of reaction force of the motor for control of a torsion state of the driving motor when the driver's intention for releasing the P step is determined or the release of the vehicle's stop is predicted after whether the control of torque of reaction force of the motor is started is determined, and determining whether the control of torque of reaction force of the motor is terminated during the control of torque of reaction force of the motor.

There are four methods of determining whether the control of torque of reaction force of the motor is necessary and started.

A first method is a method of determining starting control of torque of reaction force of a motor immediately after a gear lever enters a P step. According to the method, control of torque of reaction force of the motor is performed while starting control of torque of reaction force of the motor is determined. This method may be simply applied because whether control of torque of reaction force is required and started is determined using only a P step entrance signal. However, when a position of a gear lever is in a P step irrespective of whether torsion occurs in a drive shaft, control of torque of reaction force of the motor is immediately performed, and thus when holding time of the P step is extended, energy (from a battery) required to perform control of torque of reaction force may be excessively used and a temperature of an inverter for control of the motor may be excessively increased.

A second method is a method of starting control of torque of reaction force of the motor after a P step release signal is input. When the P step release signal (e.g., when the position of a gear lever is changed to another gear from the P step) is input, it is determined that the stop of the vehicle is released, and vehicle vibration generated in the case of release of a P step may be decreased by determining control start of torque of reaction force of the motor simultaneously with inputting the P step release signal and performing control of torque of reaction force of the motor. This method may be easily applied like the first method and may decrease use of excess energy (battery) generated in the first method. However, when input of the P step release signal is performed later than mechanical release of the P step of the gear lever, torque is re-applied to a drive shaft while torsion of the drive shaft is released to generate vibration and, thus, vibration decrease capability may be degraded or excitation may rather be generated.

When a parking apparatus (a parking gear system) is configured as a shift-by-wire type, time for driver manipulation for release of a P step and time for mechanically releasing the P step may be randomly set, and thus when the P step release signal is input, the control of torque of reaction force of the motor may be started so as to mechanically release the P step using the second method.

A third method is a method of monitoring user manipulation of a brake pedal so as to determine whether position control of a driving motor or velocity control is started. When a position value of a brake pedal is equal to or less than a first reference value $BPS_{th}$ after entrance of a gear lever of the vehicle on a slope into the P step, it may be determined that torsion of the drive shaft occurs as driving wheels are moved according to brake release, and it may be determined whether the control of torque of reaction force of the motor is started.

In other words, when the position value of the brake pedal is equal to or less than the first set reference value $BPS_{th}$ after the gear lever of the vehicle on a slope enters the P step, it is determined that torsion occurs in the drive shaft, and then it is determined to start control of torque of reaction force of the motor.

The first reference value $BPS_{th}$ used to determine whether the control of torque of reaction force of the motor is started may be set and used as a constant value for determining a brake release state or may be set and used as a value changed according to an inclination angle of a road where the vehicle is parked, a vehicle weight, or the like.

In addition, in order to secure steady state time for occurrence of torsion of a drive shaft, that is, in order to secure time taken until the drive shaft that is twisted when a brake is released after entrance of the gear lever into the P step returns to a steady state by the twist being naturally removed before the release of the P step, when a position value of a brake pedal is equal to or less than the first reference value $BPS_{th}$ and predetermined time elapses, whether the control of torque of reaction force of the motor is started (performing the control) may be determined.

In other words, in order to accurately determine whether torsion of the drive shaft occurs due to brake release after the vehicle is parked on a slope, when the position value of the brake pedal is equal to or less than the first reference value $BPS_{th}$ and a predetermined time elapses, whether the control of torque of reaction force of the motor is started may be determined.

Here, a value detected by a position sensor of the brake pedal installed in a vehicle may be used as the position value of the brake pedal.

Figure 3:
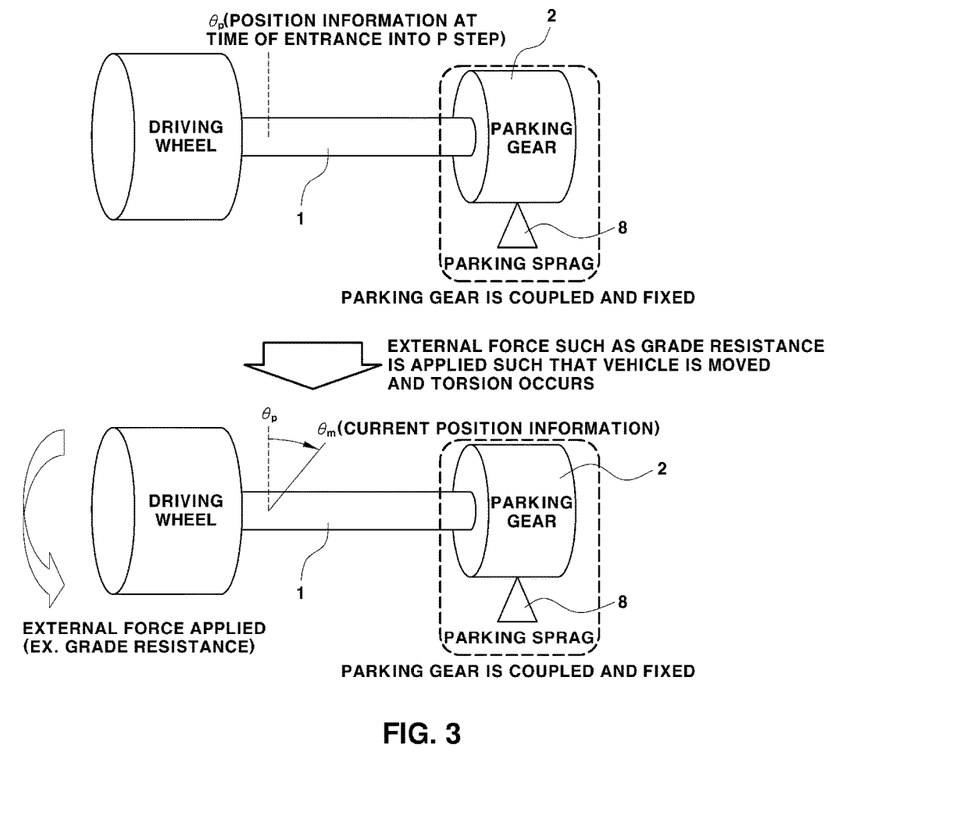
FIG. 3 is a schematic diagram illustrating the case in which position information of a drive shaft is changed by the occurrence of torsion in the drive shaft equipped with a parking gear due to an external force (e.g., grade resistance) applied to driving wheels connected to the drive shaft.
Figure 4:
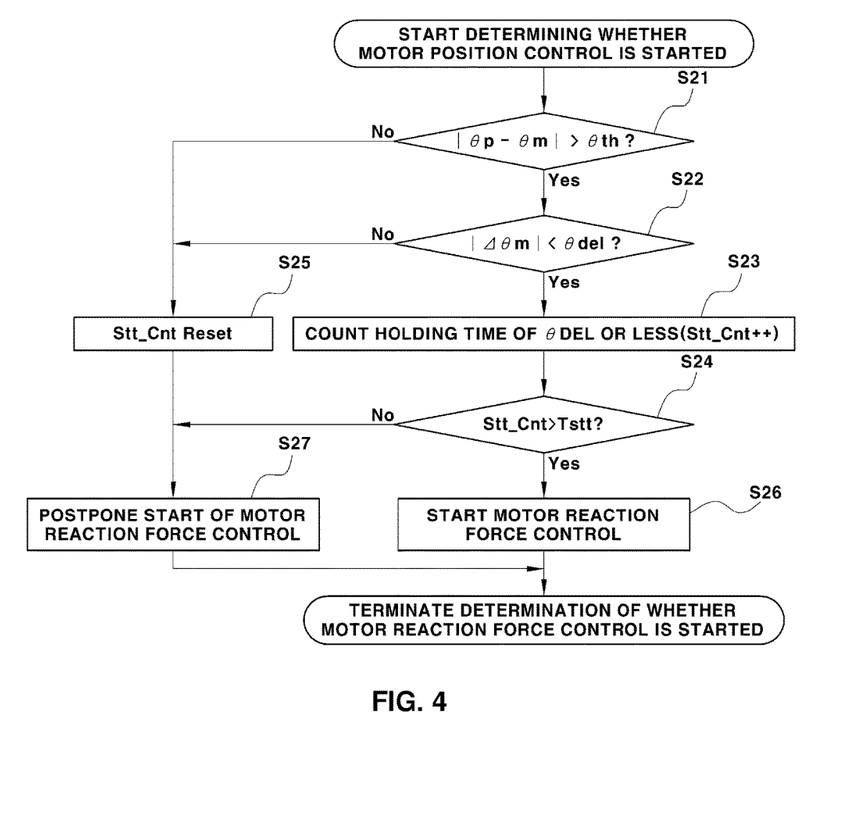
FIG. 4 is a flowchart illustrating a fourth method of determining whether control of torque of reaction force of the motor is necessary and started.

FIG. 3 is a schematic diagram illustrating the case in which position information of the drive shaft is changed since torsion occurs in a drive shaft with a parking gear according to an external force (e.g., grade resistance) applied to driving wheels connected to the drive shaft. FIG. 4 is a flowchart illustrating a fourth method of determining whether control of torque of reaction force of the motor is necessary and started.

The fourth method of determining whether control of torque of reaction force of the motor is necessary and started is a method of directly determining whether torsion of the drive shaft occurs so as to control a position of a driving motor or to control velocity. In this method, whether the control of torque of reaction force of the motor is required and started may be determined using the positional information of the drive shaft between a parking gear and a driving wheel.

Referring to FIG. 3, when the gear lever enters the P step, the parking gear 2 may be locked as a parking sprag 8 operated according to a position of the gear lever is engaged between teeth of the parking gear 2 installed in the drive shaft 1, thereby locking the driving wheels. In this case, when external force such as grade resistance due to inclination of a road is applied to driving wheels of the vehicle, reaction force is generated in the parking sprag 8 engaged between teeth of the parking gear 2 as the driving wheels are moved, and thus torsion occurs in the drive shaft 1 to change a position of the drive shaft 1.

Accordingly, as illustrated in FIG. 4, when an absolute value of a difference between positional information θp of the drive shaft at time of entrance of the gear lever into the P step and positional information θm of the drive shaft after entrance into the P step is equal to or more than a predetermined first set value θth, it may be determined that torsion occurs in the drive shaft (S21), and in order to check a steady state of occurrence of torsion of a drive shaft, that is, in order to check whether the drive shaft that is twisted when brake is released after entrance of the gear lever into the P step naturally returns to a steady state before the P step is released, when a current position variation value Δθm of the drive shaft may be calculated and the calculated position variation value Δθm is maintained to be equal to or less than a predetermined second set value θdel for predetermined time Tstt (S22, S23, and S24), whether the control of torque of reaction force of the motor is started (performing the control) may be determined by controlling a position of the motor (S26).

The current position variation value Δθm of the drive shaft may be an absolute value of a difference between first drive shaft position information θm1 and second drive shaft position information θm2, which are acquired in real time with a predetermined time difference after entrance into the P step.

In particular, when holding time when the calculated position variation value Δθm is equal to or less than a predetermined second set value θdel (S22) is counted (S23), if the counted time is equal to or more than predetermined time Tstt (S24), whether control of torque of reaction force of the motor is started may be determined by controlling a position of the motor (S26).

In this case, when positional information of a drive shaft between a parking gear and driving wheels is not capable of being used, integral calculus may be performed on torsion velocity information of the drive shaft to acquire drive shaft position information, and the acquired drive shaft position information may be used.

By using these methods, when it is predicted that the driver releases the P step at the time of determining the occurrence of torsion in the drive shaft, it is determined to perform control of torque of reaction force of the motor.

Here, a value detected by a position sensor of the brake pedal installed in a vehicle may be used as the drive shaft position information.

In order to release the P step of the gear lever of the vehicle parked on a slope, the driver needs to re-depress the brake pedal before the release of the P step, and thus control of torque of reaction force of the motor may be actually and restrictedly performed only when the driver depresses the brake pedal after determining that the control of torque of reaction force of the motor is started in the aforementioned four methods of determining whether control of torque of reaction force of the motor is necessary and started.

In this case, whether the driver depresses the brake pedal may be determined based on a detected value (brake pedal position value) of a brake pedal position sensor (BPS), and when the detected value (brake pedal position value) is equal to or more than a set second reference value, the brake pedal may be determined to be depressed, and the second reference value may be set as a predetermined constant value BPS$_{FnOn}$ or may be set to a value changed according to a weight of a vehicle, an inclination angle of a road where the vehicle is parked, or the like.

In other words, after control of torque of reaction force of the motor is determined to be started due to the occurrence of torsion in the drive shaft of the vehicle that enters a slope, when the position value of the brake pedal before the release of the P step of the gear lever is equal to or more than the second set reference value, and thus it is determined that the parking of the vehicle is released, control of torque of reaction force of the motor is performed.

In particular, after the vehicle enters the slope and then torsion occurs in the drive shaft of the vehicle, that is, after whether control of torque of reaction force of the motor is started is determined, in other words, after it is determined to perform control of torque of reaction force of the motor, whether control of torque of reaction force of the motor is actually performed may be determined based on the brake pedal position value, and in this case, when the brake pedal position value is equal to or more than a second reference value, control of torque of reaction force of the motor for control of a torsion state of the driving motor may be performed.

In other words, in the present disclosure, after it is determined to start control of torque of reaction force of the motor due to the occurrence of torsion in the drive shaft after the gear lever of the vehicle on a slope enters the P step and then it is predicted that the P step of the gear lever is released before the release of the P step of the gear lever, in other words, when the driver's intention of releasing the P step is determined, that is, it is predicted that the stop of the vehicle is released, control of torque of reaction force of the driving motor is performed by driving the driving motor of the vehicle so as to generate torque of reaction force.

When it is determined that the control of torque of reaction force of the motor is started and the control of torque of reaction force of the motor is performed, torque of reaction force of the motor may be basically calculated using a weight of a vehicle and an inclination angle of a road where the vehicle is parked, and the torque of the reaction force may be corrected using a motor velocity value after the torque of reaction force of the motor is applied to the drive shaft.

First, motor reaction force torque TQ$_{ctrl.1}$ may be calculated using a weight m$_{veh}$ of a vehicle and an inclination angle θ of a road where the vehicle is parked according to Equation 1 below. Here, g represents acceleration of gravity.

$$TQ_{ctrl.1} = m_{veh} \cdot g \cdot \sin\theta \qquad \text{[Equation 1]}$$

As the weight m$_{veh}$ of the vehicle, a measured value may be used if the value is measurable or an empty vehicle weight may be used, and the motor reaction force torque itself may be corrected in an operation in which the motor reaction force torque is applied to the drive shaft and is corrected. In addition, the vehicle weight may be estimated during driving according to Equation 2 below and may be used. In Equation 2, Vveh represents a vehicle velocity, Ttotal represents total torque generated by a drive shaft, Cd represents a running resistance coefficient to which a vehicle projected area is applied, ρ represents air density, and Cr represents a rolling resistance coefficient of a driving wheel. Alternatively, a vehicle weight estimated using another estimation method may be used.

$$m_{veh} \cdot \dot{v}_{veh} = T_{total} - 1/2 \cdot \rho \cdot C_d \cdot v_{veh}^2 - C_r \cdot m_{veh} \cdot g - m_{veh} \cdot g \cdot \sin\theta \qquad \text{[Equation 2]}$$

In addition, a measured value may be used as the inclination angle θ of a road if the value is measurable or the inclination angle θ may be estimated using a longitudinal acceleration value of a vehicle. When a position of the gear lever is in a state in which the gear lever enters the P step and the vehicle stops, the inclination angle θ of a road may be estimated via calculation according to [Equation 3] below, and in [Equation 3], a$_{long}$ represents a longitudinal acceleration value of a vehicle. Alternatively, an inclination angle estimated using another estimating method may be used.

$$\theta = \sin^{-1}\left(\frac{a_{long}}{g}\right) \qquad \text{[Equation 3]}$$

The motor reaction force torque determined via calculation may be corrected using a motor velocity value when the P step of the gear lever is released (when the stop of the vehicle is released) after the motor reaction force torque is applied to the drive shaft. When errors are generated between torsion torque generated due to actual torsion of the drive shaft and reaction force torque being output from a driving motor, an acceleration component may be generated in the motor velocity, and in this case, the errors may be represented according to [Equation 4] below. In [Equation 4], TQact is actual torsion torque, J is rotational inertia of a drive shaft, and w$_{mot}$ represents a motor velocity.

$$TQ_{act} - TQ_{ctrl.1} = J \cdot \dot{w}_{mot} \qquad \text{[Equation 4]}$$

Accordingly, a motor velocity may be measured through a motor velocity sensor of a vehicle and a motor acceleration component may be calculated using the measured motor velocity value to calculate reaction force torque TQctrl where the errors are corrected according to [Equation 5] below.

$$TQ_{ctrl} = TQ_{ctrl.1} + J \cdot \dot{w}_{mot} \qquad \text{[Equation 5]}$$

Then, when it is determined that control of torque of reaction force of the motor is terminated, whether a driver releases the P step may be determined. When the P step of the gear lever is released, whether the control of torque of reaction force of the motor is terminated may be determined using the motor reaction force torque TQctrl and command torque TQcmd transmitted from a higher controller of a motor controller, and in other words, when a position of the gear lever is not in the P step (stop gear), motor command torque may be received and compared with the motor reaction force torque and whether the control of torque of reaction force of the motor is terminated may be determined according to the comparison result, and whether control of torque of reaction force of the motor is terminated may be determined in terms of the following three cases.

i) When a direction (or a sign) of motor reaction force torque TQctrl is different from that of motor command torque TQcmd (TQctrl×TQcmd<0):

In this case, motor output torque is maintained at a motor reaction force torque value for a predetermined time T$_{end}$ and then is gradually changed to motor command torque, and when a difference between the motor output torque and the motor command torque is reduced to a preset threshold value or less, whether control of torque of reaction force of the motor is terminated may be determined.

ii) When motor reaction force torque TQctrl is greater than motor command torque TQcmd (TQctrl>TQcmd):

In this case, whether control of torque of reaction force of the motor is terminated may be determined using two methods. A first method is a method of determining motor output torque as a motor reaction force torque value and outputting the motor reaction force torque value without determination of whether the control of torque of reaction force of the motor is terminated until the motor command torque is greater than the motor reaction force torque. A second method is a method in which the motor output torque is maintained to motor reaction force torque for predetermined time and then is gradually changed to motor command torque, and whether the control of torque of reaction force of the motor is terminated is determined when a difference between the motor output torque and the motor command torque is reduced to a threshold value or less like in the aforementioned method of the case in which the direction (or the sign) of motor reaction force torque TQctrl is different from that of motor command torque TQcmd.

iii) When the motor reaction force torque TQctrl is smaller than the motor command torque TQcmd (TQctrl<TQcmd):

In this case, the motor output torque is changed to the motor command torque and, immediately, whether the control of torque of reaction force of the motor is terminated may be determined.

In addition, a value through a filter such as a low pass filter (LPF) may be used as the motor reaction force torque used herein.

In addition, the control described above is performed by an integrated controller mounted in the vehicle or controllers including the aforementioned MCU and BMS mounted in the vehicle.

According to the present disclosure, vibration generated as reaction force with respect to torsion of a drive shaft vanishes may be decreased by outputting reaction force by a driving motor instead of a parking sprag in the case of release of a P step when a gear lever enters the P step via control of reaction force of the driving motor and then torsion occurs in the drive shaft.

Accordingly, an eco-friendly vehicle configured in such a way that a driving motor is mechanically connected to a drive shaft may decrease vehicle vibration generated in the case of the P step release via control of the driving motor using a software method instead of a hardware method of enhancing a structure.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method of reducing vibration during release of a stop gear of a vehicle, the method comprising:
    determining, by a controller, whether a position of a gear lever of the vehicle is a P step for stop on a slope;
    determining, by the controller, whether torsion occurs in a drive shaft connected to a driving wheel of the vehicle; and
    performing, by the controller, control of torque of reaction force of a driving motor so as to generate torque of reaction force by driving the driving motor of the vehicle when a driver's intention for releasing the P step is determined in a state where torsion occurs in the drive shaft,
    wherein when the position of the gear lever is the P step for stop, it is determined that the vehicle is stopped, and when an absolute value of a difference between drive shaft position information at a time of entrance of the gear lever into the P step and positional information of the drive shaft after entrance into the P step is equal to or greater than a first set value, it is determined that torsion occurs in the drive shaft.

2. The method of claim 1, wherein whether the vehicle is stopped on a slope is determined using information obtained from at least one of an inclination angle sensor and a map, and it is determined that the vehicle is stopped when the position of the gear lever is the P step for stop.

3. The method of claim 1, wherein after the gear lever enters the P step, when a current position variation value of the drive shaft after entrance into the P step is maintained to be equal to or less than a second set value for a predetermined time, it is determined to start control of torque of reaction force of the motor.

4. The method of claim 1, wherein the determining of the occurrence of torsion comprises determining that torsion occurs in the drive shaft according to a brake release when a position value of a brake pedal of the vehicle is equal to or less than a first reference value.

5. The method of claim 4, wherein the control of torque of reaction force of the motor is determined to be started when the position value of the brake pedal is maintained to be equal to or less than the first reference value for a predetermined time.

6. The method of claim 1, wherein when force that is applied toward a driving direction of the vehicle and is calculated using a weight of the vehicle and an inclination angle of a road where the vehicle is parked is equal to or more than a threshold value, it is determined that torsion occurs in the drive shaft of the vehicle.

7. The method of claim 1, wherein a reaction force torque satisfies $TQ_{ctrl.1}=m_{veh} \cdot g \cdot \sin\theta$, and a reaction force torque where errors generated when the stop of the vehicle is released are corrected satisfies $TQ_{ctrl}=TQ_{ctrl.1}+J \cdot \dot{w}_{mot}$, where $TQ_{ctrl.1}$ is the reaction force torque, $TQ_{ctrl}$ is the corrected reaction force torque, J is a rotational inertia of the drive shaft, $w_{mot}$ is a motor velocity, $m_{veh}$ is a vehicle weight, $\theta$ is an inclination angle of a road, and g is acceleration of gravity.

8. The method of claim 1, wherein:
    in order to determine whether the control of torque of reaction force of the motor is terminated, a motor command torque is received and compared with a motor reaction force torque when the position of the gear lever is not the P step for stop;
    as a comparison result, when a direction of the motor reaction force torque is not a direction of the motor command torque, a motor output torque is maintained to the motor reaction force torque for a predetermined time and then gradually is changed to the motor command torque; and
    it is determined that the control of torque of reaction force of the motor is terminated when a difference between the motor output torque and the motor command torque is a threshold value or less.

9. The method of claim 8, further comprising:
    determining that the control of torque of reaction force of the motor is terminated, as the comparison result, when the motor reaction force torque is greater than the motor command torque.

10. The method of claim 8, further comprising, when the motor reaction force torque is greater than the motor command torque:
    maintaining the motor output torque to the motor reaction force torque for the predetermined time and then gradually changing the motor output torque to the motor command torque, as the comparison result; and determining that the control of torque of reaction force of the motor is terminated when a difference between the motor output torque and the motor command torque is equal to or less than a threshold value.

11. The method of claim 8, further comprising:
immediately determining that the control of torque of reaction force of the motor is terminated, as the comparison result, when the motor reaction force torque is less than the motor command torque.

12. The method of claim 1, wherein when a position value of a brake pedal of the vehicle is equal to or more than a second reference value in a state where torsion occurs in the drive shaft, it is determined that the stop of the vehicle is released.

13. A non-transitory computer readable medium containing program instructions executed by a processor, the computer readable medium comprising:
program instructions that determine whether a position of a gear lever of a vehicle is a P step for stop on a slope;
program instructions that determine whether torsion occurs in a drive shaft connected to a driving wheel of the vehicle; and
program instructions that perform control of torque of reaction force of a driving motor so as to generate torque of reaction force by driving the driving motor of the vehicle when a driver's intention for releasing the P step is determined in a state where torsion occurs in the drive shaft,
wherein when the position of the gear lever is the P step for stop, it is determined that the vehicle is stopped, and when an absolute value of a difference between drive shaft position information at a time of entrance of the gear lever into the P step and positional information of the drive shaft after entrance into the P step is equal to or greater than a first set value, it is determined that torsion occurs in the drive shaft.

\* \* \* \* \*